United States Patent [19]
French et al.

[11] Patent Number: 5,965,814
[45] Date of Patent: Oct. 12, 1999

[54] FREEZE/OVERFLOW DETECTOR WITH DEACTIVATING MECHANISM

[76] Inventors: Arnold E. French, 12211 Cedar Gap, Houston, Tex. 77072; Phillip M. Miller, 5229 Maple, Bellaire, Tex. 77401

[21] Appl. No.: 08/955,067

[22] Filed: Oct. 21, 1997

[51] Int. Cl.$^6$ ............................ G01F 23/00; H01H 35/18
[52] U.S. Cl. .......................... 73/304 R; 307/118
[58] Field of Search .................. 73/304 R; 307/118; 340/604, 605, 612, 616, 618, 620; 700/61.04

[56] References Cited

U.S. PATENT DOCUMENTS

| | | | |
|---|---|---|---|
| 4,027,497 | 6/1977 | Thurman | 62/156 |
| 4,265,262 | 5/1981 | Hotine | 307/118 |
| 4,380,243 | 4/1983 | Braley | 307/118 |
| 4,505,328 | 3/1985 | Schmitt | 62/263 |
| 4,742,244 | 5/1988 | Koener | 73/304 R |
| 4,787,212 | 11/1988 | Hessey | 340/604 |
| 4,796,658 | 1/1989 | Caple | 73/304 R |
| 4,804,947 | 2/1989 | Geleziunas | 340/620 |
| 4,860,551 | 8/1989 | Query | 62/140 |
| 4,896,052 | 1/1990 | Morrison et al. | 307/118 |
| 4,937,559 | 6/1990 | Meacham et al. | 340/618 |
| 4,987,408 | 1/1991 | Baron | 340/604 |
| 5,196,729 | 3/1993 | Thorngren | 307/118 |
| 5,239,203 | 8/1993 | Thorngren | 307/118 |
| 5,621,400 | 4/1997 | Corbi | 73/304 R |
| 5,632,302 | 5/1997 | Lenoir, Jr. | 340/604 |
| 5,793,294 | 8/1998 | Schepka | 73/304 R |

*Primary Examiner*—William Oen
*Attorney, Agent, or Firm*—Arnold French; Phillip Miller

[57] ABSTRACT

An electrical circuit control system with multiple sensing probes used to detect the presence of excessive accumulations of moisture, in its liquid or frozen form in single or multiple phase air refrigerant systems. The electrical circuit control system will disengage the related electrical system when electrically alerted by the detecting sensors that an abnormal level of liquid or ice has occurred. The detecting sensors operate independently, therefore the control system will function properly with one sensor being utilized or with more than one sensor in place. Further, it utilizes multiple sensors, for detection, that are remote from the circuit control system and connected by electrically conductive leads at one end to the circuit control system and at the respective other end to the detection sensors. After the excessive accumulation of liquid or ice has been removed, the air refrigerant system will remain in an off position until reset by removing and reconnecting the main power source. The detection sensors are installed at a determined location in the suspect areas, using rectangular clips that allow perpendicular adjustment of the detecting sensors to be located within the limited spaces provided by the manufacturers and at a position determined to be the most advantageous for early detection of abnormal levels of moisture accumulations in its liquid or frozen form. Alternative embodiments of the invention provide a control signal to activate when the system has been turned off due to problematic conditions. Another embodiment of the invention protects personnel from electrical shock upon contact with the electrical circuit control system and extends the functional period of the circuit control system by protection from the elements of its environment.

7 Claims, 6 Drawing Sheets

COOLING COIL FRONT VIEW

22

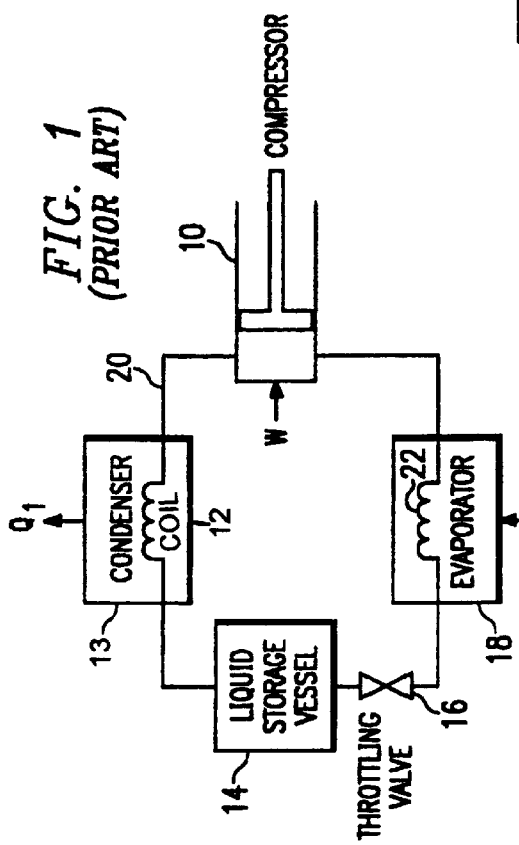
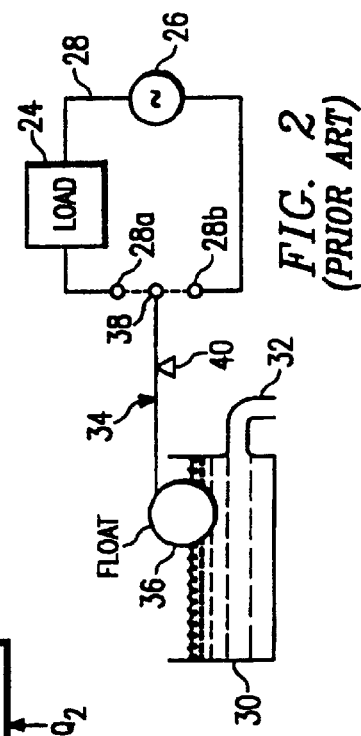
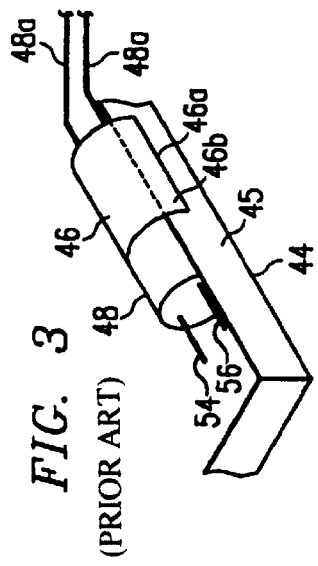

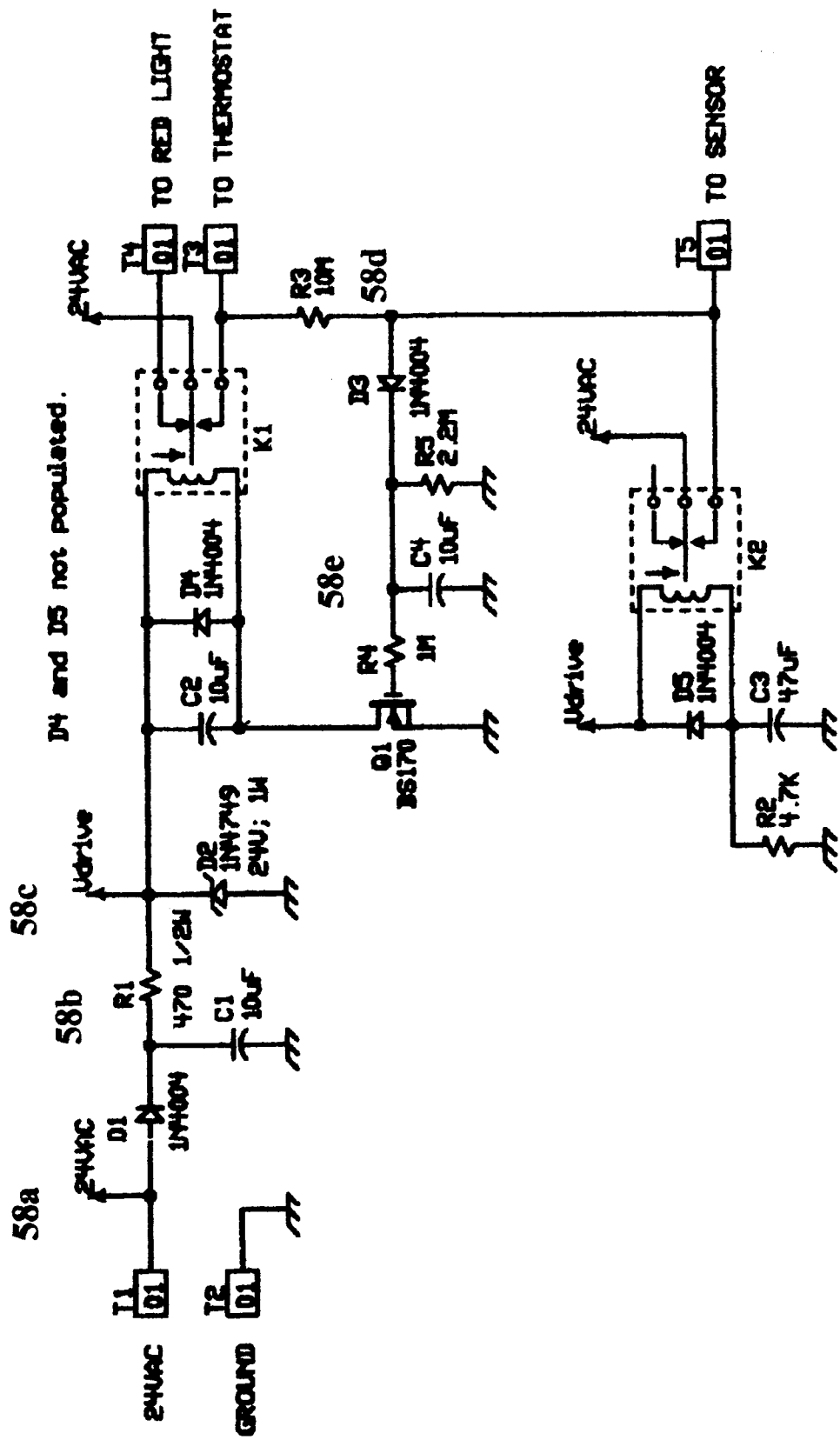

FREEZE/OVERFLOW DETECTOR WITH DEACTIVATING MECHANISM

BACKGROUND OF THE INVENTION

1. Field of Invention

This invention relates to a circuit with multiple remote sensors that detect excessive water in liquid form or in frozen form. More specifically, it relates to a circuit with multiple sensors that detect excess levels of accumulated moisture in liquid or frozen form and activates a control switch to disengage the associated system. It is most specifically related to the control of excess accumulated moisture in liquid or frozen form in air conditioning refrigerant systems.

2. Description of Related Art

Referring first to FIG. 1, a typical air refrigerant system 24 consists of a compressor 10, a compressor valve 10a, a valve chamber 10b, a condenser 13, condensing coil 12, a liquid storage vessel 14, a throttling valve 16, an evaporator 18, and a cooling coil 22, connected by a suitable conduit 20. The refrigerant, stored in the liquid storage vessel 14 is a liquid which partly vaporizes and cools as it passes through the throttling valve 16. Among the common refrigerants are ammonia, sulphur dioxide and various halides of methane and ethane. The refrigerant most often used in air refrigerant systems 24 is chlorodifluoromethane, commonly referred to as Freon™. Nearly constant pressures are maintained on either side of the throttling valve 16 by means of the compressor 10. The mixed liquid and vapor entering the evaporator 18 is colder than the near-surround. Thus, the mixed liquid and vapor absorbs heat from the interior of the refrigerator box or cold room and completely vaporizes. The vapor is then forced into the compressor 10, where its temperature and pressure are increased as a result of the compression. The compressed vapor then pours into the condenser 13, where it cools down and liquifies as the heat is transferred to outside air, water, or other fluid medium in the condensing coils 12.

In such air refrigerant systems 24 the evaporator 18 often lowers the air temperature below the dew point. As a result, moisture will condense on the cooling coil 22. For this reason, air refrigerant systems 24 are also provided with an overflow pan (not yet shown) for collecting moisture condensed on the cooling coil 22. The moisture collected by the overflow pan is then removed by an overflow line (not yet shown). However, dust and other airborne debris as well as algae may accumulate in the overflow pan and eventually plug the overflow line. In other circumstances, a sewer line (not shown) to which the overflow line is typically connected, may become plugged due to causes unrelated to the air refrigerant system 24 itself In any event, whenever the overflow pan is prevented from draining, the level of condensation in the overflow pan will steadily increase until the pan overflows, thereby causing water damage to the air refrigerant system 24 and its environment.

In an effort to resolve this problem, manufacturers of air refrigerant systems built a secondary overflow pan connected to a separate overflow line beneath the primary overflow pan. When the overflow line of the primary overflow pan becomes plugged, condensation will collect in the primary overflow pan until filled. The overflow would then spill over into the secondary overflow pan and drain by way of the overflow line of the secondary overflow pan. While such secondary overflow drainage systems made condensation overflows less likely, they offered no protection from overflows if both drainage systems were blocked. It is not uncommon for both the primary and secondary overflow pan to be plugged at the same time taking into consideration that the same condition that plugs one will usually plug the other. As a result, overflow protection systems often include a switching system to turn the air refrigerant system off in the presence of condensation overflow conditions.

Referring next to FIG. 2, a float actuated switching system for an air refrigerant system 24 may now be seen. U.S. Pat. No. 3,473,553 Thomas Collins Oct. 21, 1969. The air refrigerant system in FIG. 2 consists of a load, which may include the air refrigerant system of FIG. 1, #24 connected to a relay via a temperature activated relay (not yet shown) of conventional design, connected in series to a low voltage electrical transformer (not yet shown) using electrical connectors 28. The overflow pan, which may either be a primary overflow pan (not yet shown) or a secondary overflow pan 30, collects condensating liquid which drains via the overflow line 32. A float actuated switch 34 includes a float 36 positioned in the secondary overflow pan 30 and an electrical contact 38 balanced by a pivot or fulcrum 40. When the level of condensation in the secondary overflow pan 30 is low, the electrical contact 38 is engaged with the contacts 28a and 28b of the air refrigerant system 24, thereby permitting power to flow through the (load) air refrigerant system 24, thus maintaining the air refrigerant system 24 in an ON condition. In the event that the overflow line 32 becomes plugged, condensation will begin to accumulate in the secondary overflow pan 30, raising the level of the float 36. When the float 36 has been raised to a specified height, the electrical contact 38 will disengage from the contacts 28a and 28b, thereby disconnecting the (load) air refrigerant system 24 from the AC source 26 and turning the air refrigerant system OFF. Unfortunately, due to space limitations imposed during the manufacture of air refrigerant systems 24, float actuated switches 34 such as the one described herein are often too large to fit into the primary overflow pan (not yet shown) which is positioned within the cooling coil housing (not yet shown). In addition, air currents within the cooling coil housing (not yet shown) could easily displace the float 36, thereby resulting in erroneous switching. Finally, float activated switches 34 are particularly undesirable when liquid is draining at a rate just slightly less than the rate at which condensation is being collected by the secondary overflow pan 30. For example, the overflow line 32 may be partially plugged such that drainage of the accumulated condensation from the secondary overflow pan 30 is occurring at a lightly below normal rate while condensation continues to accumulate at a normal rate. Under these circumstances, the float actuated 34 switch could rapidly oscillate between the ON and OFF states, a condition which may result in damage to the air refrigerant system 24 and allowing overflow into its environment.

Another attempt at solving this problem was invented by John T. Thorngren, U.S. Pat. No. 5,196,729 Mar. 23, 1993. Referring now to FIG. 3. This invention is a control switch 48, that mounts to the sidewall 45 of the secondary overflow pan 30 by mounting means such as a cylindrical clamp 46 fitted into a slitted sidewall 46a and having two liquid detecting probes 54 and 56 extending outward which, upon detection of liquid, disconnects the air refrigerant system 24. This invention has several limitations and deficiencies as discussed in the following paragraphs.

While containment of condensation water droplets is a major problem, and the one that has been addressed to this point, there is yet another frequent problem. Specifically, ice. When compressed Freon™ passes through the throttling valve 16, it causes a phase change from liquid to gas. The Freon™ is cold due to the phase change and is passed through cooling coils 22 that act as a heat exchanger removing heat from air passing over the cooling coils 22, If the Freon™ temperature is lower than the dew point of the air, moisture condenses on the cooling coil 22. If the Freon™ temperature is lower than 32 degrees Fahrenheit, frequently caused by various malfunctions in the system, the accumulated moisture that has formed on the cooling coils 22 will freeze, thus forming ice on the cooling coils 22 and eventually damaging the system to the point that the ice will bend the cooling coils 22, causing a puncture in the tubing and releasing the Freon™, thus causing the compressor 10 to malfunction and stop operating. Applicant has personally observed ice to be, in some cases, throughout the entire cooling coil 22 equal in size to a block of ice approximately 9"×22"×36" or larger, before the compressor 10 malfunctions due to excessive stress on the compressors valve 10a due to improper mix of Freon™ vapors now being fed into the valve chamber 10b. When the compressor 10 shuts off due to the damaged valve 10a, the ice that had previously formed begins to rapidly melt causing water to leak, first into the primary overflow pan (not yet shown) then spilling over into the secondary overflow pan 30 in larger amounts and at a faster rate than the normal condensation. This melted ice, or water, causes overflow, even if both primary and secondary overflow pans are functioning properly, because the blower (not shown), which would still be working, sends forced air into the path of the melting ice causing constant sprays throughout the attic or space where the air refrigerant system was installed. Additionally, the rate at which the ice would melt, due to the natural temperature of the area of installation, would be overwhelming to the overflow pans, both primary (not yet shown) and secondary 30. Considering most installations of air refrigerant systems 24 for air conditioning purposes are installed on top of a building, as in commercial applications, or in an attic or overhead space as in residential applications, water from the melted ice causes damage from flooding, to the floor of the area of installation and eventually damages the ceiling of the room beneath. Undetected, this condition would, in multiple story buildings, continue downward damaging floors, ceilings and contents, through several stories. Thorngren's invention has no capability to monitor ice.

Additionally, Thorngren's control switch 48 contains the circuit (not shown) and the liquid detecting probes 54 & 56. This requires it to be of a size that prohibits installation in small, tight areas such as the space allowed by the design of air refrigerant systems 24 between the cooling coil 22 and the primary overflow pan (not yet shown). Therefore his control switch 48 would be installed only in the secondary overflow pan 30 where more space is afforded by the designers of the air refrigerant systems.

Furthermore, the sidewall 45 of the, usually metal, secondary overflow pan 30 must be cut to create a slit to accommodate the control switch 48 to be wrapped by the cylindrical clamp 46. This necessary slit in the sidewall 45 of the secondary overflow pan 30 could allow the water to leak out of the secondary overflow pan 30 before it reaches his horizontally installed control switch 48. In Thorngren's invention, the primary overflow pan (not yet shown) must be in an overflow condition and the secondary overflow pan 30 must be in a near overflow condition before this invention initiates.

It is also noted that Thorngren's control switch 48 is attached to the top edge of the secondary overflow pan 30 at a position, very near the top edge of the secondary overflow pan 30 with a cylindrical clamp 46. Condensation overflow pans vary greatly in different types of installations, depending upon the size of the air conditioning system installed. Commercial systems, which normally have no secondary overflow pan 30, will require different levels of detection due to varying sizes of primary overflow pans (not yet shown). To be efficient in early detection and quickly disengaging the system to eliminate damage related to overflow conditions, the location of the control switch 48 within the overflow pans would need to be perpendicularly adjustable The invention described does not include any means for such adjustment.

It is further observed that Thorngren's invention, having the circuit (not shown) and probes 54 & 56 inside a single control switch, 48 could not be used in multiple stage systems that have 2 or 3 separate cooling coils which would require multiple remote detection.

OBJECTS AND ADVANTAGES

It is an object of this invention to provide a circuit in a separate location from multiple sensing units which can be placed in the primary overflow pan, and/or the secondary overflow pan and /or at different strategic locations on the cooling coils to reliably detect excessive accumulations of moisture, in frozen or liquid form, in its early stages and provide a quickly effected disconnect to the related system.

Another object of this invention is to utilize a rectangular clip to hold the sensor(s) that allows adjustment in a perpendicular range from the bottom of the overflow pans, enabling the installer to strategically place them in a position that would be closest to the bottom of the pan, yet slightly above the top portion of the drain hole thereby enabling the probes, extending from the sensor, to detect accumulated moisture in the earliest stage of a plugged drain, thereby eliminating an overflow condition.. The strategic placement of these sensors within the rectangular clip would provide the earliest detection possible.

Still another object of this invention is to utilize multiple sensors attached to a remote central circuit by electrically conductive leads, to detect accumulated moisture in its liquid or frozen form, and initiate a disconnect of the associated system, that are small enough to fit into the limited space that is allowed by the manufacturers of air conditioning refrigerant systems in both commercial and residential applications. The separation of the circuit and the sensor affords a smaller device that will fit into the primary overflow pan as well as the secondary overflow pan.

Another object of this invention is to utilize multiple sensors attached to a central circuit by electrically conducting leads to detect accumulated moisture in its liquid or frozen form that is capable of monitoring multiple stage systems that have 2 or 3 cooling coils.

It is a further object of this invention to utilize sensors installed in an adjustable clip for detection of freeze or overflow which includes an indicator lamp alerting the consumer that a shut down has occurred and advise the consumer of what action to take, namely, a notice for service.

It is another object of this invention to provide a normally ON control switch for an associated electrical system which, upon the detection of excessive liquid and or accumulation of ice, will lock into an OFF state, thereby disconnecting the associated electrical system and will remain in the OFF state after the excessive liquid accumulation, whether caused by excessive moisture accumulation or ice melting, has been removed.

Another object off this invention is to provide a means of re-setting the associated system by disconnecting the main source of power and re-establishing the power, after removing the offending condensation.

It is a further object of this invention to utilize a circuit, remote from the sensor(s), that requires no alteration of the overflow pans, such cutting a slit in the sidewall, for installation. The sensor(s) are attached into a rectangular clip that fits over the edge of the overflow pan(s).

Finally, it is an object of this invention to provide a circuit that is coated with a non-conductive material, such as plastic, to protect against electrical shock and to extend the life of the circuit by protecting it from the elements of its environment.

BRIEF DESCRIPTION OF THE DRAWINGS

My invention will be better understood and its numerous unique and advantageous features will become apparent to those skilled in the art by reference to the following drawings in which;

FIG. 1 is a block diagram of an air refrigerant system;

FIG. 2 is a schematic of a float control switch for an air refrigerant system.;

FIG. 3 is a perspective view of a detecting device which activates a control switch upon detection of accumulated moisture controlling the operation of the associated air refrigerant system

FIG. 6 is a perspective view of the operation of the control system for controlling the air refrigerant system.

SUMMARY

Considering the inadequacies of the prior art devices such as the two described above, applicant has been motivated to develop a practical and effective means of providing a system which has eliminated these deficiencies.

In accordance with the present invention, applicant has developed a new and novel device incorporating multiple detection sensors which operate in any combination, that is, any one or more sensor will detect excessive accumulated moisture and/or any accumulation of ice and controls the related system to a shut off position.

Figure 4:
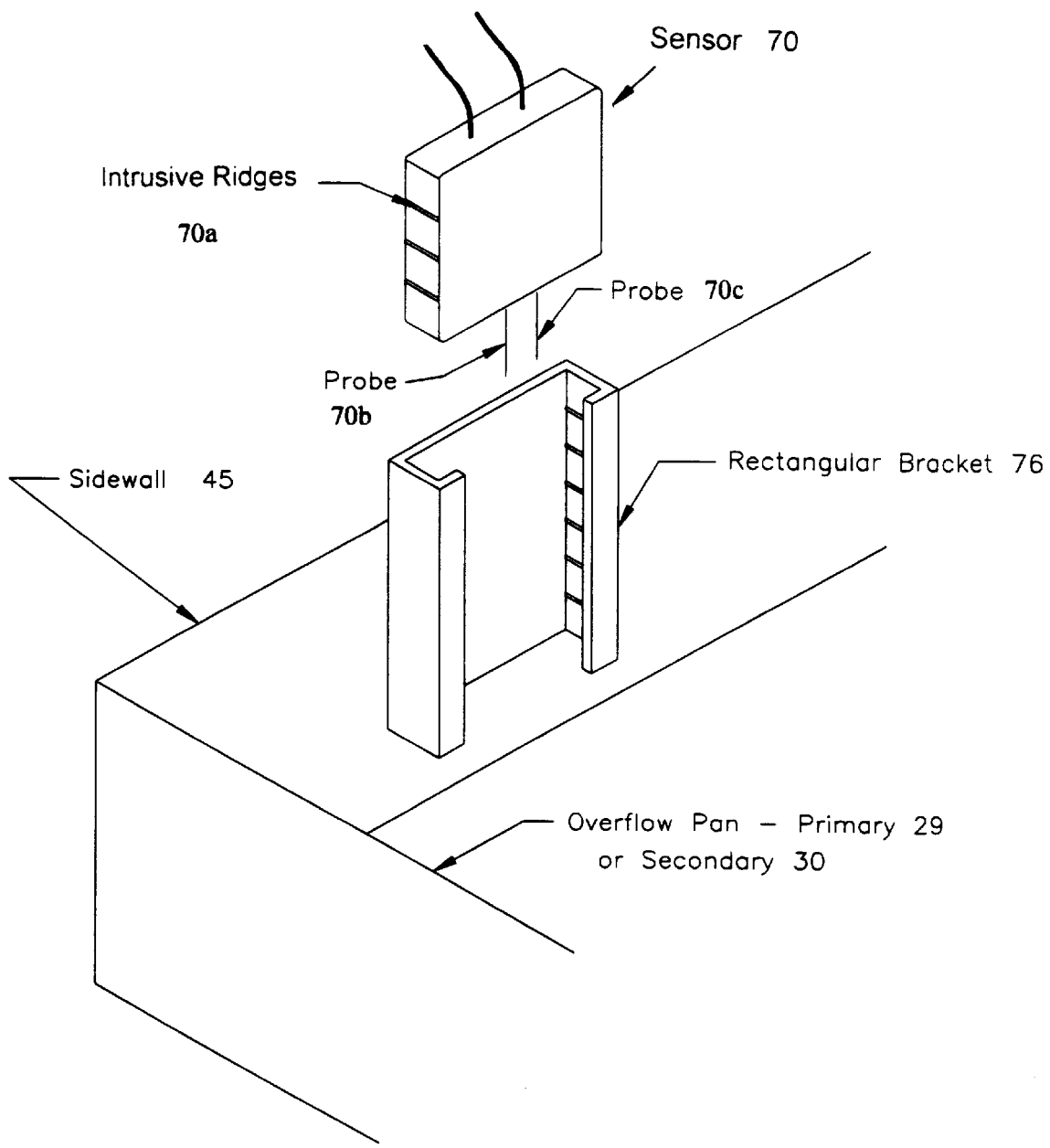
FIG. 4 is an overview of the rectangular bracket and its relation to the sensor with intrusive ridges and the sidewall of the overflow pan
Figure 4A:
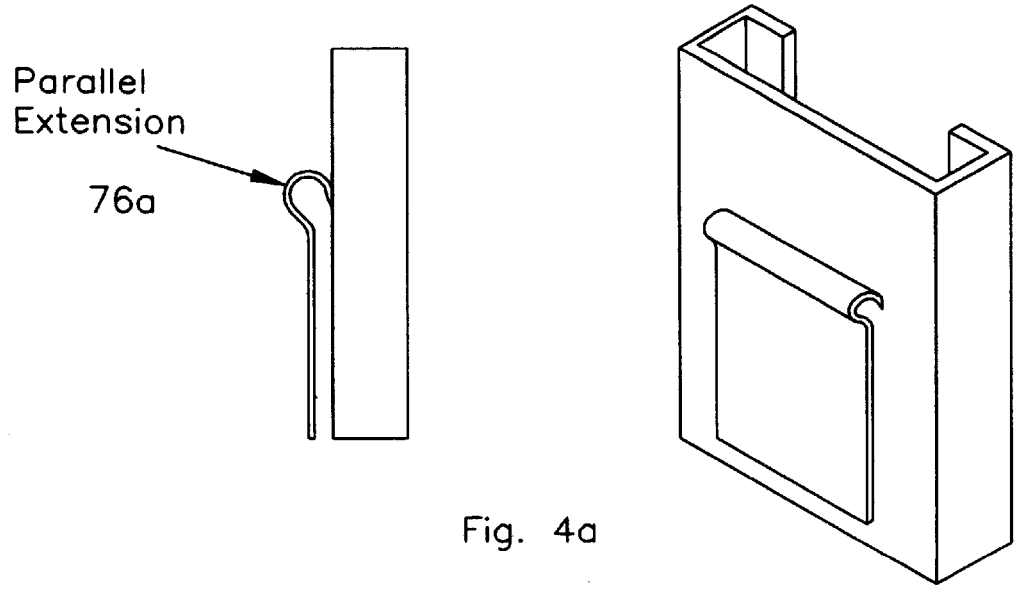
FIG. 4a is a side view of the rectangular bracket depicting the outward parallel extension.
Figure 4B:
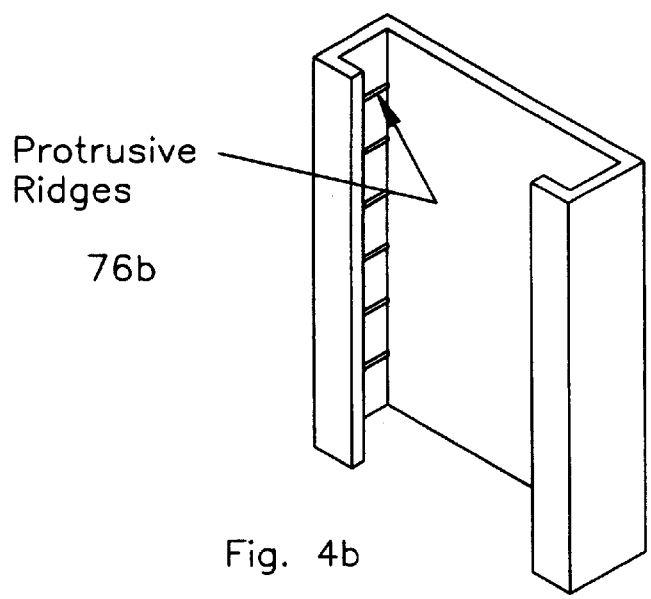
FIG. 4b shows the rectangular bracket with protrusive ridges that fit into the intrusive ridges of the sensor, allowing adjustment in a range perpendicular to the bottom of the overflow pan, while holding the sensor securely in place. In other words, the sensor can be moved up or down to a desired level and be left there, securely fitted by the notches in the bracket fitting into the slots in the sensor.
Figure 5:
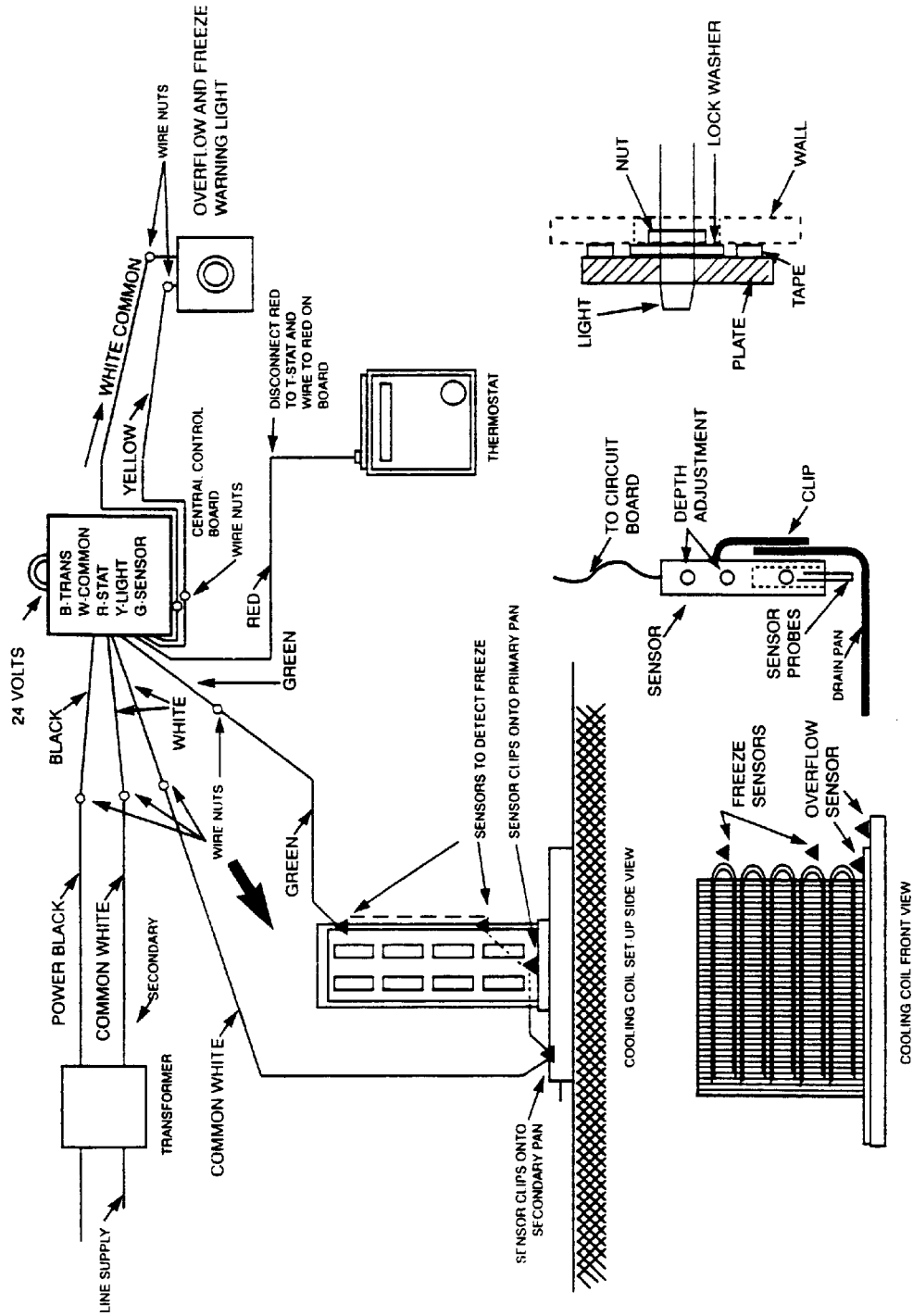
FIG. 5 is an overview of the present invention wherein multiple sensors are placed in the primary and/or secondary overflow pans to detect excessive moisture accumulation and/or on the cooling coils to detect any accumulation of ice and quickly disengage the system to prevent overflow conditions.
Figure 5A:
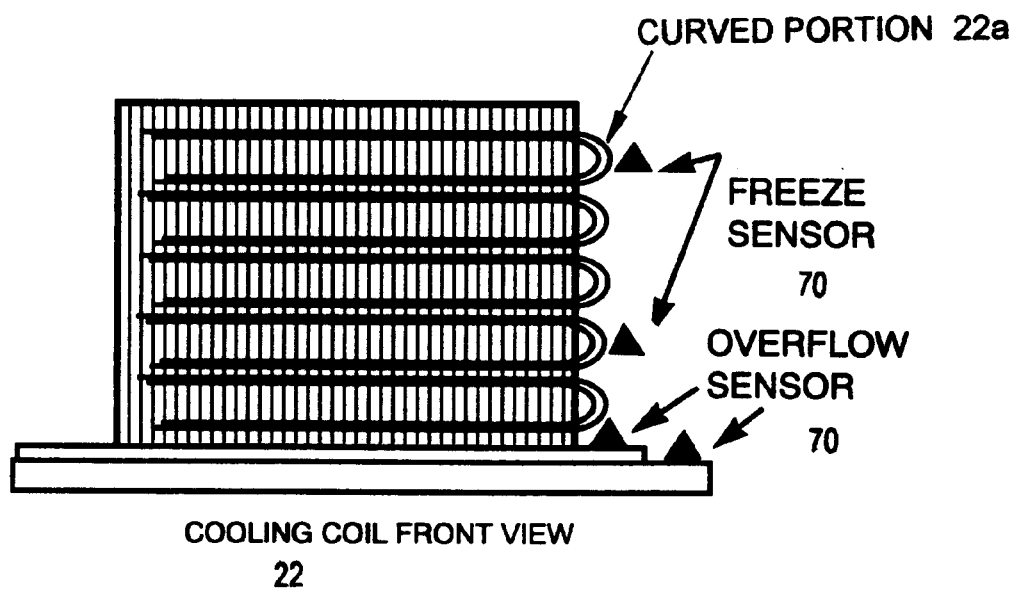

DESCRIPTION OF INVENTION—FIGS. 4 to 6

This invention is directed to a control system which detects the presence of moisture in liquid or frozen form and controls the associated air refrigerant system based upon the detection of moisture by detecting sensor(s).

Referring to FIGS. 4–6, a control system for detecting the accumulation of moisture in liquid or frozen form, controlling the operation of an associated air refrigerant system based upon the detection of accumulated moisture and constructed in accordance with the teachings of the invention, shall now be described in detail.

As previously discussed, condensate from the cooling coil 22 of the air refrigerant system will begin to accumulate in the primary overflow pan 29. When the drain (not shown) becomes clogged due to dust, other airborne debris, algae or mold, the increasing accumulation of moisture spills over into the secondary overflow pan 30. To detect an excessive level of accumulated moisture in the primary overflow pan 29, or the secondary overflow pan 30 a detecting sensor 70 is mounted to the sidewall 45 of the primary overflow pan 29 and the sensor 70 is mounted to the sidewall 45 of the secondary overflow pan 30 by means of a rectangular bracket 76 attached to the sensor 70 and having an outward parallel extension 76a for receiving the sidewall 45 of either the primary 29 or secondary 30 overflow pan between the outward parallel extension 76a and the rectangular bracket 76. The rectangular bracket 76 has protrusive ridges 76b to allow the detecting sensor 70, with intrusive ridges 70a such that the detecting sensor 70 can be securely positioned at a selected location at different heights from the bottom of the primary overflow pan 29 or the secondary overflow pan 30.

As previously discussed, frozen water may accumulate on the cooling coils 22 of the air refrigerant system due to lack of air flow or a leak in the Freon™ pipe. To detect the accumulation of frozen moisture on the cooling coils 22 of the air refrigerant system, one detecting sensor 70 is mounted to the curved portion 22a of the Freon™ pipe of the cooling coils 22 by means of a wire, such as a wire tie, and a second detecting sensor 70 is mounted in a similar manner as the first, on the opposite side of the cooling coil 22. Considering many air refrigerant systems require more than one cooling coil 22, such as commercial applications, detecting sensors 70 can be similarly mounted on each.

So long as frozen water does not accumulate on the cooling coils 22 contacting the sensor probes 70b and 70c and the water accumulating in the primary overflow pan 29 and secondary overflow pan 30 does not contact the sensor probes 70b and 70c, the associated air refrigerant system will operate normally. In the event that sufficient frozen water accumulates on the cooling coil 22 or sufficient water accumulates in the primary overflow pan 29 or the secondary overflow pan 30 such that the moisture in frozen or liquid form contacts any of the sensor probes 70b or 70c, a hazardous condition exists and the control system 58 will disconnect the associated air refrigerant system in a manner to be more fully described below. The associated air refrigerant system will remain OFF, even after the frozen water has melted and the level of water in either primary 29 or secondary overflow pan 30 drops such that the water no longer contacts the sensor probes 70b and 70c, until the control system 58 is reset. The control system 58 is mounted in the air refrigerant system in the compartment where the electrical transformer 64 is mounted, connected in parallel to each detecting sensor 70 via electrically conductive material such as insulated wire.

Referring to FIG. 6, the operation of the control system 58 for controlling an associated air refrigerant system can now be described in greater detail. The associated air refrigerant system includes an electrical transformer 64, connected in parallel with the control system 58 which is connected in series to a temperature activated relay 80. The electrical transformer 64 is connected to terminals 58a and 58b of the control system 58 which includes a half wave rectifier HW1 constructed of diode D1 and capacitor C1. Diode D1 is connected between terminals 58a and 58b. Capacitor C1 is connected between terminal 58b and ground. The half wave peak rectifier HW1 converts alternating current flowing in the AC side, i.e. the side of the half wave rectifier connected to the low voltage electrical transformer 64, to direct current flowing in the DC side, i.e. the circuitry on the side of the half wave rectifier HW1 opposite to the low voltage transformer 64, thereby resulting in a positive voltage at terminal 58b. Terminal 58b is connected in series with resistor R1 and terminal 58c. A zener diode D2 is connected to terminal 58c and ground, producing a reduced voltage at terminal 58c required for relays K1 and K2.

The first relay K1 having two terminals for the coil positive (P1) and negative (N1) and three terminals for the switches; common (C1), normally open (NO1), and normally closed (NC1). The relay K1 is connected at C1 terminal to the low voltage transformer 64 with NC1 terminal connected to the warning light 86 and NO1 terminal connected to the temperature activated relay 80. Terminal P of relay K1 is connected to terminal 58c and N1 terminal is connected to the drain terminal D of N-channel MOSFET transistor Q1 with capacitor C2 connected between terminal 58c and drain terminal D of the transistor Q1 having drain (D), gate (G) and source (S) terminals. Terminal S is connected to ground and the gate terminal G is connected to resistor R4. The other end of resistor R4 is connected to terminal 58e, the direct current side of the second half wave rectifier HW2. The second half wave rectifier HW2 is constructed of capacitor C4 and diode D3. Diode D3 is connected between terminals 58d and 58e. Capacitor C4 is connected between terminal 58e and ground. Resistor R5 is connected between terminal 58e and ground. Resistor R3 is connected between NO1 terminal of relay K1 and terminal 58d to limit the amount of current flow. Sensor probe 70b is connected to terminal 58d and to NO2 terminal of relay K2 having two terminals for the coil positive (P2) and negative (N2) and three terminals for the switch common (C2) normally open (NO2) and normally closed (NC2). Terminal NC2 of relay K2 is connected to the low voltage electrical transformer 64 terminal P2 of relay K2 is connected to terminal 58c, and terminal N2 is connected to resistor R2 and capacitor C3 with the other ends of resistor R2 and capacitor C3 connected to ground. The second sensor probe 70c is also connected to ground With no moisture, frozen or liquid, contacting the sensor probes 70b, and 70c, voltage is applied to the half wave rectifier HW1, such as from the electrical supply 68, the control system 58 is activated. The voltage at terminal 58c energizes the coil in relay K2, thereby engaging the switch to the NO2 terminal conducting current to the second half wave rectifier HW2, the gate terminal of the transistor Q1 and to the detecting sensor probe 70b. Thus applying a positive charge to the gate terminal of the transistor Q1 allowing capacitor C2 to charge up and energizing the coil of relay K1 thereby engaging the switch to the NO1 terminal operating the associated air refrigerant system.

If this positive charge on the gate terminal G of transistor Q1 is neutralized or replaced with negative charge, for example, by providing a conductive path from the gate terminal G of the transistor Q1 to ground, the transistor is turned OFF, thereby de-energizing the coil of relay K1 thus turning off the air refrigerant system. Thus, if any moisture, frozen or liquid, accumulates in the primary overflow pan 29 or the secondary overflow pan 30 or any of the cooling coils 22 contacts the detecting sensor 70, a high conductive path from the gate terminal G of the transistor Q1 to ground via the accumulated moisture produced by the air refrigerant system will permit the voltage stored in capacitor C4 to decrease in approximately 40 seconds, thereby turning off the air refrigerant system. Thus, by varying resistor R5 a first means for adjusting the sensitivity of the control system 58 to presence of accumulated moisture, in frozen or liquid form, at the detecting sensor 70. The sensitivity of the control system 58 may be modified, i.e. the sensitivity may be increased by decreasing the value of resistor R5. Similarly, a second means for adjusting the sensitivity of the control system 58 may also be provided. Here, the sensitivity of the control system 58 may be increased by reducing the value of capacitor C4. By increasing the sensitivity of the control system 58 such that a fast time required to remove the positive charge on the gate terminal G of the transistor Q1 it is hereby contemplated that the control system 58 will not be limited to the time required to remove or replace the positive charge, but shall also be able to decrease the time required, for example, approximately 1 second.

When the positive charge at the gate terminal G of the transistor Q1 has been removed, the resistor R5 will maintain a neutral, or negative, charge t the gate terminal G of the transistor Q1. As a result, when the conductive path from the gate terminal G of the transistor Q1 to ground via the accumulated moisture, in frozen or liquid form, contacting the detecting sensor 70 is removed, for example, by the removal of the accumulated liquid in the primary overflow pan 29, the resistor R5 will maintain a neutral, or negative, charge at the gate terminal G of the transistor Q1, thereby preventing the control system 58 from turning on. In such a manner the control system 58 switches into and locks in, the off condition when the detecting sensor 70 detects an accumulation of moisture, in frozen or liquid form, thereby preventing the air refrigerant system from switching to the on state when the accumulated moisture is removed.

The control switch 58 is reset i.e. returned to the ON state by permitting the charge across the capacitor C5 to completely decrease followed by the reestablishment of current through the control system 58 thus returning a positive charge to the gate terminal G of the transistor Q1. For example, reconnecting the AC source by providing a voltage surge across the control system 58 or allowing the negative charge on the gate terminal G of the transistor Q1 to leak off, followed by turning the power back on.

Exemplary values for the components of the control system 58 such that the control system 58 shall operate as set forth above are as follows:

| Component/Value | |
|---|---|
| K1 | 24 volts dc, 10 amps |
| K2 | 24 volts dc, 10 amps |
| Q1 | 60 volts (drain to source), 5 ohms (drain to source), 0.5 amps |
| R1 | 470 ohms |
| R2 | 4700 ohms |
| R3 | 10 Meg ohms |
| R4 | 1.0 Meg ohms |
| R5 | 2.2 Meg ohms |
| C1 | 10 mf |
| C2 | 10 mf |
| C3 | 47 mf |
| C4 | 10 mf |
| D1 | 400 peak reverse voltage |
| D2 | 24 volt, 1.0 watt |
| D3 | 400 peak reverse voltage |

Thus, there has been described and illustrated herein a control system for controlling an associated electrical system such as an air refrigerant system. However, those skilled in the art will recognize that many modifications and variations besides those specifically mentioned may be made in the techniques described herein without departing substantially from the invention described herein is exemplary only and is not intended as a limitation on the scope of the invention.

Having thus described my invention I claim:

1. An electrical circuit controlling device for controlling the operation of an electrical system based upon the detection of an excessive level of overflow condensation in its liquid or frozen forms, indicative of an abnormal condition, comprising:

an electrical circuit control system in series with an electrical system and comprising a first electrically conducting lead and a second electrically conducting lead, each of said electrically conducting leads being connected at one end to said electrical circuit control system, a first detecting sensor connected to a second end of said first electrically conducting lead and positioned in operative relation to a primary condensation overflow collection container for detecting an excessive level of overflow condensation in its liquid form, a second detecting sensor connected to a second end of said second electrically conducting lead positioned in operative relation to a cooling coil for detecting an excessive level of overflow condensation in its frozen form a means for connecting the circuit control system to reduced voltage electricity originating from an electrical transformer and maintaining a positive conductive charge on the circuit control system thereby causing said electrical system to remain in an on position, a means for disconnecting power from the circuit control system upon detection of said excessive level of overflow condensation by the first or second detecting sensors, a resetting means for restoring power to the electrical circuit control system by removing and re-applying electrical current from a main power source.

2. A device as in clam 1 including:

said first detecting sensor positioned at a predetermined, adjustable position, allowing earliest detection of excessive, problematic levels of the condensation accomplished by utilizing a rectangular clip mounted to a wall of said condensation container, said rectangular clip including a plurality of tabs therein.

3. The device as in claim 2 wherein said first detecting sensor includes a plurality of notches for alignment with said tabs in an adjustable relationship to permit positioning of the first detecting sensor relative to the condensation overflow collection container so as to allow for the earliest detection of excessive, problematic levels of condensation.

4. A device as in claim 1 wherein said electrical circuit control system is positioned remotely from said first and second detecting sensors.

5. A device as in claim 1 wherein said electrical circuit system includes a third and fourth electrically conducting leads, a third detecting sensor connected to a second end of said third conducting lead and positioned in operative relation to a second condensation overflow collection container for detecting an excessive level of overflow condensation in its liquid form, and a fourth detecting sensor connected to a second end of said fourth electrically conducting lead positioned in operative relation to a second cooling coil for detecting an excessive level of overflow condensation in its frozen form.

6. A device as in claim 1 including indicator means connected to said electrical circuit control system for indicating the disconnect of power to the circuit control system upon detection of an excessive level of collected condensation.

7. A device as in claim 1 wherein said electrical circuit control system is coated with non-conducting material.

* * * * *